Patented Jan. 20, 1942

2,270,252

UNITED STATES PATENT OFFICE 2,270,252

OXIDATION OF KETONES

Joseph E. Bludworth, Cumberland, Md., assignor to Celanese Corporation of America, a corporation of Delaware No Drawing. Application April 7, 1939, Serial No. 266,545

18 Claims. (Cl. 260—541)

This invention relates to the oxidation of acetone or other ketones, and relates more particularly to the oxidation of such ketones by means of air or other oxygen containing gas.

An object of my invention is to oxidize ketones in an economical and expeditious manner whereby good yields of organic acids are obtained. Other objects of my invention will appear from the following detailed description.

I have found that it is possible to oxidize acetone or other ketones to form acetic acid or other acids by the direct oxidation of the same with air or other gas containing free oxygen, the reaction, in the case of acetone, proceeding as follows:

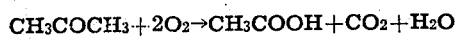

$CH_3COCH_3 + 2O_2 \rightarrow CH_3COOH + CO_2 + H_2O$

This reaction is preferably carried out while the acetone or other ketone is in vapor phase. In order to obtain best yields, I have found that certain conditions set out below should preferably be observed.

The oxidation of the acetone while in vapor phase can be caused to proceed more smoothly and controllably, with greatly increased yields both after one passage through the reaction zone and in over-all recovery, if the oxidation is caused to proceed under conditions whereby the heat of reaction is dissipated and/or absorbed to prevent too large increases of temperature and when higher reaction temperatures prevail, the time to which the products are exposed to such temperatures is greatly reduced.

To obtain the rapid dissipation of heat one or both of the following expedients are employed (1) the reactants are admixed with an inert gas or diluent such as nitrogen, which may be conveniently introduced as a recycle of part of the gases of reaction after the condensible liquid has been removed therefrom in part or in whole, and (2) the reaction mixture is caused to pass through the reaction zone at high linear velocities.

The amount of inert gas employed may be varied in accordance with the other conditions prevailing, but generally I have found that good results are obtained when the volume of inert gas recycled is from 1 to 15 or more times the combined volume of the acetone vapors and air present in the reaction. The presence of this recycled gas is advantageous, because by its bulk it increases the velocity of the reacting gases, it tends to spread the reactants over a greater amount of surface, thereby aiding in the dissipation of heat, it aids in evenly distributing or mixing the reactants, and it absorbs considerable heat that is developed in the reaction as sensible heat and thereby helps to reduce the final temperature.

As to the linear velocity of the reactant through the reaction zone, I prefer this to be high, on the order of 25 to 100 feet and up to 200 feet or more per second, depending on the cross-sectional area of the reaction zone, the greater such area the greater speed required. The high velocity insures the rapid removal of the desired product from the reaction zone before secondary reaction sets in, and also produces a high degree of turbulence which eliminates localized heating, increases heat transfer by decreasing film thickness and constantly redistributes the reactants to such a degree that the reaction follows an arrangement that can be predetermined.

The time the reactants are subjected to the temperatures of the reaction zone are short, say on the order of $\frac{1}{20}$ to $\frac{3}{4}$ second, preferably $\frac{1}{10}$ to $\frac{1}{2}$ second.

While this invention is particularly useful in connection with the oxidation of acetone to form acetic acid it may be used for the oxidation of other ketones, such as ethyl methyl ketone, diethyl ketone, etc.

While I prefer to employ air as the oxidizing agent, free oxygen or any suitable gas containing free oxygen may be employed. The amount of oxygen present is preferably not sufficient to oxidize all the ketone present, but is preferably from 15 to 60% of the theoretical amount required.

As to the temperature of the reaction, this may be up to 900° F. and is preferably from 750° to 825° F. To attain this temperature, the reactants may be preheated to 240° to 450° F. or more.

The reaction chamber is preferably made of material that has high conductivity for heat so as to dissipate the exothermic heat of reaction as rapidly as possible. Examples of suitable material are copper and silver, but metals of lower heat conductivity such as iron may be used if provision is made for increasing surface to meet the lower conductivity. The reaction chamber may be in the form of tubes or pipes.

I have found that the use of oxidation catalysts does not help in increasing the yields and in some cases does not produce yields as good as those obtained by my invention without the use of catalyst, and therefore I prefer to omit catalysts but their use is not precluded.

While I prefer to carry out the reaction at atmospheric pressures, sub-atmospheric pressures or super-atmospheric pressures up to 60 lbs. per square inch may be used.

As the oxidation of the acetone is not complete in one passage through the reaction zone, the unconverted acetone is recovered from the reaction product and re-used in the process.

In order further to illustrate my invention, but without being limited thereto, the following specific example is given.

*Example*

Acetone is introduced to a preheater at the rate of 0.015 lb. per minute, in admixture with 1 cubic foot (0.08 lb.) per minute of air and 6.67 cubic feet per minute of nitrogen which is conveniently obtained as recycle from the uncondensible gas leaving the reaction zone.

The mixture is preheated in the preheater so that its exit temperature is 400° F. and then passes through a reactor which comprises a coil of copper or iron which is ¾ inch in diameter and 37 feet in length. The mixture of gas and vapor passes through the reactor at a maximum linear velocity of 75 feet per second. A maximum temperature of 800° F. is attained in the reactor.

The mixture leaving the reactor is cooled and the acetic acid formed is condensed. The uncondensed vapors and gases are treated such as by scrubbing with water to remove the unreacted acetone which is re-used in the process, and part of the uncondensed gases, which may be treated to remove carbon dioxide, is re-used as a recycle in the process.

The yields of acetic acid are 0.014 lb. per minute.

It is to be understood that the foregoing detailed description is given merely by way of illustration and that many variations may be made therein without departing from the spirit of my invention.

Having described my invention, what I desire to secure by Letters Patent is:

1. Process for the oxidation of a lower aliphatic ketone to form an acid comprising oxidizing the ketone while in vapor form with gas containing free oxygen in the presence of at least one volume of inert gas for each volume of ketone vapor and oxygen present.

2. Process for the oxidation of acetone to form acetic acid comprising oxidizing acetone while in vapor form with gas containing free oxygen in the presence of at least one volume of inert gas for each volume of ketone vapor and oxygen present.

3. Process for the oxidation of a lower aliphatic ketone to form an acid comprising oxidizing the ketone while in vapor form with air in the presence of at least one volume of inert gas for each volume of ketone vapor and air present.

4. Process for the oxidation of acetone to form acetic acid comprising oxidizing acetone while in vapor form with air in the presence of at least one volume of added nitrogen for each volume of acetone vapor and air present.

5. Process for the oxidation of acetone to form acetic acid comprising oxidizing acetone while in vapor form with air in the presence of at least one volume of added nitrogen for each volume of acetone vapor and air present, separating the condensible products from the resulting products and recycling part of the uncondensed gas to the reaction.

6. Process for the oxidation of acetone to form acetic acid comprising preheating a mixture comprising acetone and gas containing free oxygen and passing the heated acetone vapor and gas through a reaction zone at a linear velocity of at least 25 feet per second.

7. Process for the oxidation of acetone to form acetic acid comprising preheating a mixture of acetone and air and passing the heated acetone vapor and air through a reaction zone at a linear velocity of 25 to 200 feet per second while causing the reaction to take place at a temperature of 750° to 825° F.

8. Process for the oxidation of acetone to form acetic acid comprising passing a preheated mixture of acetone vapor, gas containing oxygen and a diluent gas through a reaction zone at a linear velocity of at least 25 feet per second, condensing condensible products from the resulting products and recycling part of the uncondensed gas to the reaction.

9. Process for the oxidation of acetone comprising passing a preheated mixture of acetone vapor, air and excess nitrogen through a reaction zone at a linear velocity of at least 25 feet per second.

10. Process for the oxidation of acetone comprising passing a preheated mixture of acetone vapor, air and excess nitrogen through a reaction zone at a linear velocity of at least 25 feet per second while causing the reaction to take place at a temperature not exceeding 900° F.

11. Process for the oxidation of acetone comprising passing a mixture of acetone vapor, air and excess nitrogen preheated to a temperature of 240° to 450° F. through a reaction zone at a linear velocity of at least 25 feet per second while causing the reaction to take place at a temperature of 750° to 825° F.

12. Process for the oxidation of acetone comprising passing a mixture of acetone vapor, air and excess nitrogen preheated to a temperature of 240° to 450° F. through a reaction zone at a linear velocity of at least 25 feet per second while causing the reaction to take place at a temperature of 750° to 825° F., condensing condensible products from the resulting products and recycling part of the uncondensed gas to the reaction.

13. Process for the oxidation of a lower aliphatic ketone to form an acid comprising causing the vapor of the ketone to react with a gas containing free oxygen at elevated temperatures under such conditions that the reactants are exposed to reaction temperatures for from $\frac{1}{20}$ to $\frac{3}{4}$ second.

14. Process for the oxidation of acetone to form acetic acid comprising causing acetone vapor to react with air at elevated temperatures under such conditions that the reactants are exposed to reaction temperatures for from $\frac{1}{20}$ to $\frac{3}{4}$ second.

15. Process for the oxidation of acetone to form acetic acid comprising causing acetone vapor to react with air at elevated temperatures under such conditions that the reactants are exposed to reaction temperatures for from $\frac{1}{20}$ to $\frac{3}{4}$ second, the reaction mixture being caused to pass through the reaction zone at a linear velocity of at least 25 feet per second.

16. Process for the oxidation of a lower aliphatic ketone, to form an acid, which comprises causing the vapor of such ketone to react with a gas containing free oxygen at a temperature of 750° to 825° F. under such conditions that the reactants are exposed to the reaction temperatures for from $\frac{1}{10}$ to $\frac{1}{2}$ second.

17. Process for the oxidation of acetone to form acetic acid, which comprises causing acetone vapor to react with air at a temperature of 750° to 825° F. under such conditions that the reactants are exposed to the reaction temperatures for from $\frac{1}{10}$ to $\frac{1}{2}$ second.

18. Process for the oxidation of acetone to form acetic acid, which comprises preheating a mixture of acetone vapor and air to a temperature of from 240° to 450° F. and subjecting said preheated mixture of acetone vapor and air to a temperature of 750° to 825° F. under such conditions that the reactants are exposed to the reaction temperatures for from $\frac{1}{10}$ to $\frac{1}{2}$ second.

JOSEPH E. BLUDWORTH.